(12) United States Patent
Wang

(10) Patent No.: US 7,124,874 B2
(45) Date of Patent: Oct. 24, 2006

(54) SHIFT LEVER DEVICE

(75) Inventor: Yong Qiang Wang, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/739,999

(22) Filed: Dec. 17, 2003

(65) Prior Publication Data

US 2004/0134743 A1   Jul. 15, 2004

Related U.S. Application Data

(60) Provisional application No. 60/439,281, filed on Jan. 10, 2003.

(51) Int. Cl.
*B60N 10/10* (2006.01)
(52) U.S. Cl. .................. 192/220.4; 74/473.24
(58) Field of Classification Search ............ 192/220.4, 192/220.6, 220.2, 220.3, 220.7; 477/96; 74/473.24, 473.28
See application file for complete search history.

(56) References Cited

U.S. PATENT DOCUMENTS

| 4,880,092 | A | * | 11/1989 | Kito et al. ..................... 477/96 |
| 5,018,610 | A | * | 5/1991 | Rolinski et al. ............... 477/96 |
| 5,379,872 | A | * | 1/1995 | Dorr et al. ................ 192/220.4 |
| 5,435,424 | A | * | 7/1995 | Murakami et al. ....... 192/220.7 |
| 6,659,255 | B1| * | 12/2003 | Syamoto et al. ......... 192/220.4 |

* cited by examiner

*Primary Examiner*—Saul Rodriguez
(74) *Attorney, Agent, or Firm*—Dean B. Watson; Dura Automotive Systems, Inc.; Kevin S. MacKenzie

(57) ABSTRACT

A shift lever device for a motor vehicle is disclosed with a shift lever being operated in a longitudinal and transverse direction. A stop device is disposed in either a vertically or horizontally and vertically oriented track adjacent the shift lever so that in one condition, the shift lever is prevented from movement out of the P shift range and in another condition, the shift lever is permitted to move from the P shift range to one of the N shift range, the R shift range and the 3 D shift range. The shift lever is also prevented from "N" position into "R" position, if the vehicle speed is too high by a reverse gear lock-out device.

3 Claims, 9 Drawing Sheets

SHIFT LEVER DEVICE

CROSS REFERENCE TO RELATED APPLICATIONS

This application is related to Provisional Application 60/439,281 filed on Jan. 10, 2003.

STATEMENT REGARDING FEDERALLY SPONSORED RESEARCH

Not Applicable

REFERENCE TO MICROFISHE APPENDIX

Not Applicable

FIELD OF THE INVENTION

The present invention generally relates to a shifter device for shift-operating a transmission of a vehicle.

BACKGROUND AND SUMMARY OF THE INVENTION

Automatic transmissions for vehicles are being designed to with a large number of shift ranges to improve fuel economy and performance. One such device is disclosed in U.S. Pat. No. 5,695,029, which is incorporated herein by its entirety. The disclosed device is complicated and uses a V-shaped stopper link that is supported and rotated about a shaft. A solenoid is used to permit the rotational travel of the stopper and the selective movement of the shift lever from the to the "P" shift range to the other shift ranges under specified conditions designed to promote the safe operation of the vehicle. This design has a number of deficiencies, such as cost and complexity. Also, because of wear at the pivot point, the shift lever could be inadvertently moved out of the "P" range by the operator without energizing the solenoid. Thus, there is a need for a less complex, lower cost, more robust design that overcomes some of the deficiencies of this design. None of the prior art devices teach a solution to some of these shortcomings.

In one aspect of the present invention, a shift lever device is adapted for use in a vehicle with an activation mechanism generating a vehicle activation signal, a transmission having a plurality of shift ranges including a P shift range, a R shift range, an N shift range and a 3 D shift range and a vehicle speed sensor generating a vehicle speed signal. The shift lever includes, in combination, a brake activation device. A shift lever is connected to the transmission. The shift lever is operated in a longitudinal and transverse direction of the vehicle so as to be selectively moved to any one of the plurality of shift ranges to shift-operate the transmission. A brake sensor is connected to the brake activation device. The brake sensor generates a brake-indicating signal in response to sensing the operation of the brake activation device. A stop device is adjacent the shift lever. The stop device in one condition, prevents movement of the shift lever from the P shift range and in a second condition, permits movement of the shift device from the P shift range to one of the N shift range, the R shift range and the 3 D shift range. A solenoid device is connected to the stop device. The solenoid device moves the stop device so as to permit movement of the shift device between the one condition and the second condition. A biasing member urges the stop device toward the one condition. Additionally, an electronic controller device is connected to the solenoid device, the brake activation device, the activation mechanism and the vehicle speed sensor. The controller device in response to the brake indicating signal, the activation signal and the vehicle speed sensor sends a signal to operate the solenoid device so as to move the stop device from the one condition to the second condition in order to release the shift lever from the P shift range and to permit the shift lever to be selectively moved to one of the R shift range, the N shift range and the 3 D shift range.

In another aspect of the present invention, a shifter device is adapted for use in a vehicle with a housing including a portion forming a track and a transmission having a plurality of shift ranges including a P shift range, an R shift range, an N shift range and a 3 D shift range. The shift lever includes, in combination, a brake activation device. A brake sensor is connected to the brake activation device. The brake sensor generates a brake-indicating signal in response to sensing the operation of the brake activation device. A shift lever is connected to the transmission. The shift lever is operated in a longitudinal and transverse direction of the vehicle so as to be selectively moved to a plurality of shift ranges to shift operate the transmission. A stop device is disposed in the track. The track is oriented relative to the housing so that the stop device in one condition prevents the shift lever from moving out of the P shift range and in another condition permits the shift lever to move in the track into one of the N shift range, the R shift range and the 3 D shift range. Additionally, an electronic controller is connected to the stop device and the brake activation device. The controller in response to the brake-indicating signal permits the stop device to move in the track from the one condition to another condition.

In still yet another aspect of the invention, a method of controlling the shift lever of a vehicle transmission having a plurality of shift ranges including a P shift range, a R shift range, an N shift range and a 3 D shift range is disclosed. The method includes providing a brake activation device to generate an activation signal in response to sensing operation of the brake activation device. Moving the shift lever in a longitudinal and transverse direction of the shifter to select any one of a plurality of shift ranges to shift-operate the transmission. Providing a stop device in a track so that in one condition, the shift lever is prevented from moving out of the P shift range and in another condition, the shift lever is permitted to move into one of the N shift range, the R shift range and a 3 D shift range. Urging the stop device into one of an abutting position, an adjacent but spaced away position and an adjacent position with the shift lever to prevent movement out of the P shift range. Additionally, providing an electronic controller to control the movement of the stop device so that the signal from the brake activation device to the controller allows the stop device to move in the track so that the shift lever is permitted to move from the one condition to another condition.

Those skilled in the art will recognize from the foregoing disclosure and from the following discussion of certain preferred embodiments, that the novel shifter device represents a significant advance in this area of technology.

BRIEF DESCRIPTION OF THE DRAWINGS

Certain preferred embodiments will be discussed below in detail with reference to the appended drawings wherein.

Figure 1:
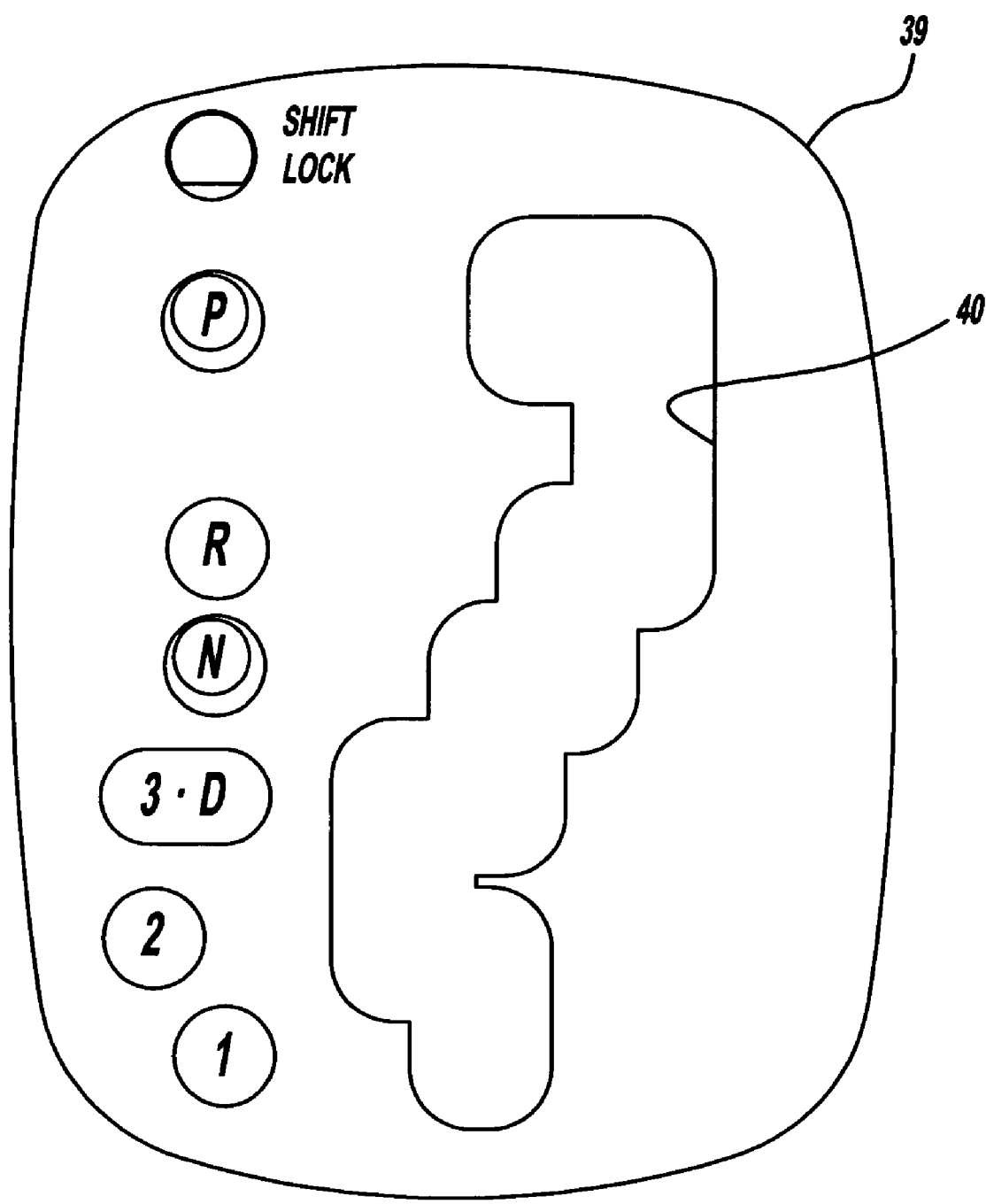
FIG. 1 is a top view of the guide hole in the shifter device including an U-shaped bracket according to the present invention.
Figure 2:
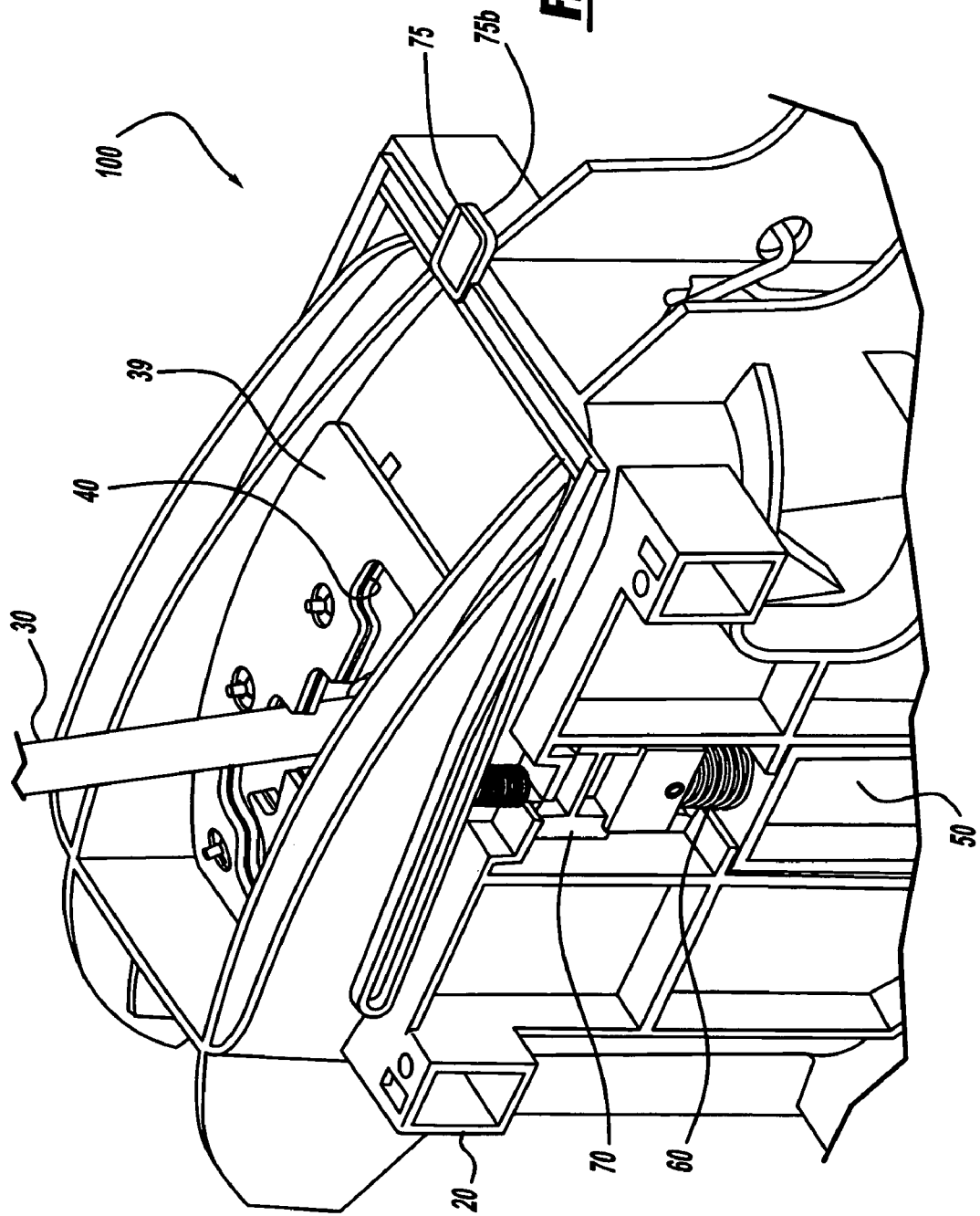
FIG. 2 is a perspective view of the housing of the shifter device with a manual push button override device.
Figure 3:
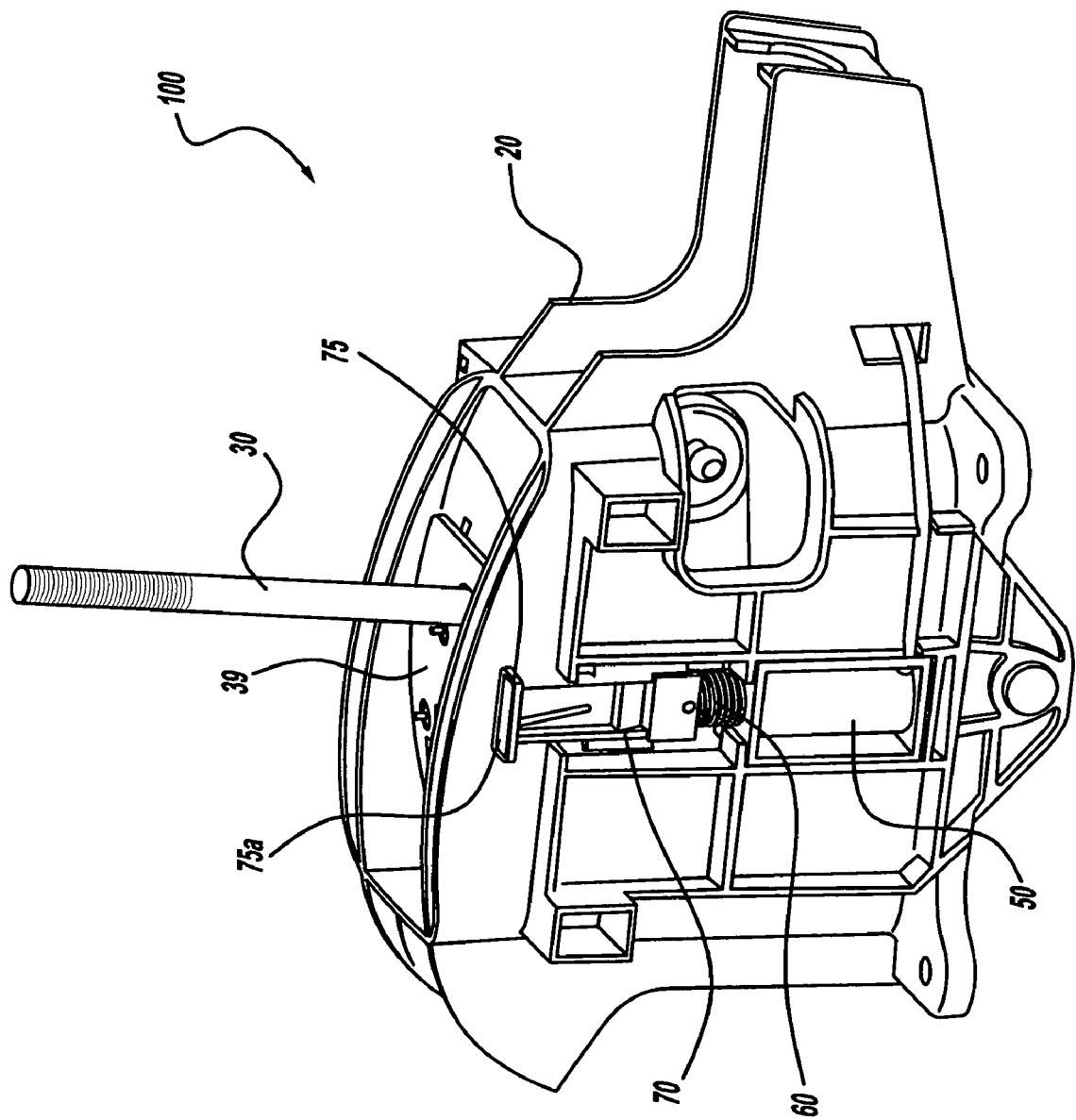
FIG. 3 is a side perspective view of the housing of the shifter device with a manual push button override device integrated into the lock lever.

The figures referred to above are not necessarily drawn to scale and should be understood to present a simplified representation of the invention and illustrative of the basic principles involved. The novel shift device according to the present invention will have configurations and components determined, in part, by the intended application and use environment. Some features of the shift device as depicted in the accompanying figures have been enlarged or distorted relative to others to facilitate visualization and understanding. In particular, thin features may be thickened and long features shortened. References to direction and position, unless otherwise indicated, refer to the orientation of the shifter device and components illustrated in the drawings. It should be understood that shifter device could be adapted for use in any orientation for motor vehicle applications.

DEESCRIPTION OF THE PREFERRED EMBODIMENTS

The novel shift device as disclosed herein will be recognized by those skilled in the art to be suitable for numerous applications. As indicated previously, the shifter device is particularly well suited for controlling the operation of a transmission in a motor vehicle. For convenience of illustration, the appended drawings illustrate a shift lever device with a stop device in a vertical track that is suitable for use with an automatic transmission to control the movement of the shift lever. Nevertheless, those skilled in this area of technology will recognize that the principles of the invention here disclosed and described can be modified in many ways without departing from the teachings of the invention. For example, the biasing member may be a leaf spring, an elastomer or a suitable plastomer and the track that guides the stop device need not be vertical but may be inclined angularly in both a horizontal and vertical orientation so long as the track permits the stop device to move away from the P shift range into the N shift range, the R shift range, or the 3 D shift range as required by the teachings of the invention.

As shown in FIGS. 1–9, a gate-type shifter for use in a motor vehicle according to the present invention is provided with a stop to control the movement of a shift lever in a shift housing from the P shift range to other shift ranges in an automatic transmission (not shown). In one condition, the stop prevents movement of shift lever from the P shift range to shift ranges other than the P shift range and in another condition, the stop is configured to permit the movement of the shift lever from the P shift range to the N shift range, the R shift range and the 3 D shift range as will be discussed later on herein.

The shift lever device according to the invention is designated by the numeral 100. The shift lever device includes a stop 10, a shift housing 20, shift lever 30, a solenoid 50, a biasing member 60, a guide block 70 and an electronic controller 80. The stop 10 is disposed in a chamber 55 in shift housing 20. One end 31 of shift lever 30 is connected by a pin 36 to a shaft 32 in housing 10. Shift lever 30 freely rotates around the axis of shaft 32 and about pin 36. A link (not shown) is attached to lever 30. The link is connected to an automatic transmission (not shown) as is conventional.

The shaft of shift lever 30 projects through a guide plate 39 and guide hole 40 (as shown in FIG. 1) and is formed to operate in a serpentine path, that is, concave and convex portions are continuously formed into a guide hole 40 in the housing 20. Shift lever 30 is operated in the longitudinal and transverse directions of the motor vehicle along guide hole 40 (i.e. in a zigzag line) so as to be shifted as is conventional. Guide hole 40 has a serpentine path that is formed with circumferential wall so as to correspond to each shift position of the shift lever, i.e., respective shift ranges of "P", "R", "N", "3-D", "2" and "1". Those skilled in the art will recognize that an equivalent designation for "3-D", by way of non-limiting example is, "3 D," Drive, "D" or a similar designation. The serpentine path restricts movement of the shift lever and at the same time, guides the shift lever to a specific shift range.

Shift lever 30 has a projection 38 with a nose portion 38a and an adjacent platform portion 38b. Projection 38 extends transversely of the housing toward stop 10 as will be described later on herein. Projection 38 is preferably located underneath cover plate 39 that has a serpentine path similar to guide hole 40. The cover plate provides identification indicia of the various shift range positions.

Stop 10 cooperates with and is adjacent to projection 38 and includes conventional electromechanical solenoid 50. Solenoid 50 is attached to a lower portion 55a of chamber 55 in a track in the housing 20. A biasing member 60 disposed about a shaft 52 extending from the solenoid 50 as is conventional and a guide block 70 is connected to the shaft 52. The biasing member 60 is located between the guide block 70 and the top of the outer cover of the solenoid 50. The guide block 70 is pivotally mounted to shaft 52 and extends axially away from solenoid 50. Biasing member 60 urges block 70 away from solenoid 50.

Guide block 70 has a laterally extending body 72 with four-side walls 74. At one end of the guide block, a pair of spaced apart legs 76 project from two of the four-side walls. One wall 74a of the four-side walls acts as a guide portion 78 to cooperatively engage the nose portion 38a of projection 38 and another wall 74b, extends form wall 74a so as to cooperatively engage platform portion 38b of projection 38, as will be described herein later. Legs 76 project from the body of guide block 70 and form an open-ended cavity. Pin 71 extends through the open-ended cavity and each of the pair of legs 76 and passes through a bore in the shaft 52 of solenoid 50 to connect the shaft to guide block 70. The guide block is disposed in the track in the housing 20 above chamber 55. The ends 78 of walls 74 engage the walls of an open space or track in housing 20 above chamber 55. The walls of the open space act as a guide path or track so that the guide block moves substantially vertically therein. Alternatively, the guide path need not be oriented substantially vertically in housing 20 but can project angularly so that the guide path is formed in a longitudinal and vertical plane to guide the guide block longitudinally and vertically according to the teachings of the invention.

The illustrated biasing member 60 is coil spring. Alternatively, the biasing member may be a leaf spring or a polymeric member with elastomeric properties. One end of the coil spring is disposed in the track in the housing above the chamber 55a and bears against a top wall 56 of solenoid 50. The other end of member 60 bears against the guide block 70. Biasing member 60 urges guide block 70 away from solenoid 50. In one condition, that is, when the solenoid is not energized, guide portion 78 of guide block 70 prevents longitudinal movement of nose portion 38a and consequently shift lever 30 is prevented from moving longitudinally in guide hole 40 and out of the "P" shift range position. This is because the path in guide hole 40, which is adjacent to the "P" shift position, restricts movement of shift lever 30 in a transverse direction, and since nose portion 38a is either adjacent to, adjacent but spaced apart from or abuts against guide 78, shift lever 30 movement is restricted to transverse movement only in guide path 40 and longitudinal movement is prevented. In another or second condition, that is, when the solenoid is energized by the controller, as will be described below, the solenoid moves the guide block 70 away from the nose portion 38a and toward the solenoid so that the nose portion 38a is no longer restricted by guide 78 to movement in a transverse direction only and movement of the shift lever is permitted longitudinally and transversely as appropriate in guide hole 40.

Figure 4:
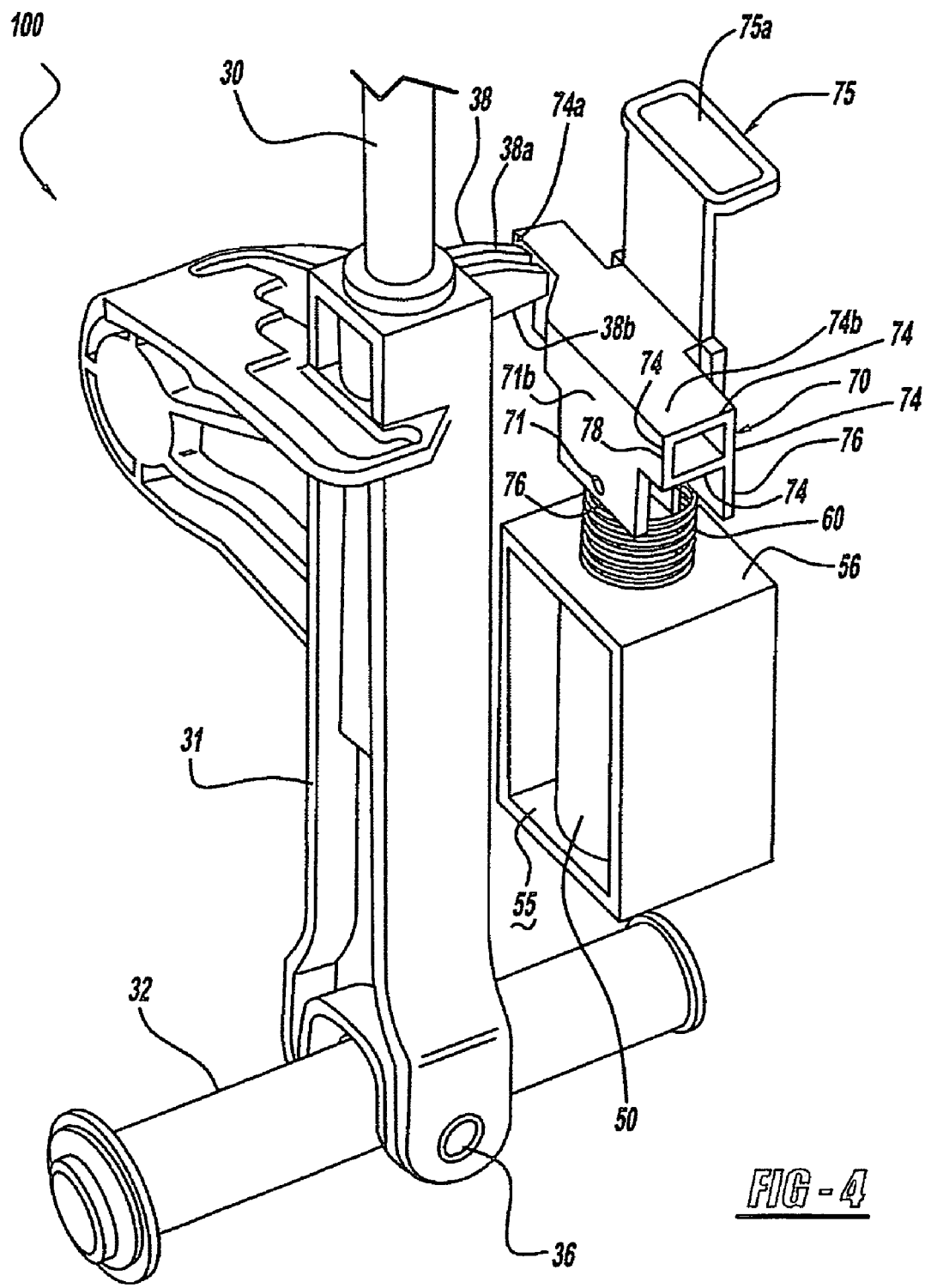
FIG. 4 is a perspective view of the shift lever with a projection showing the nose portion adjacent the stop disposed in a cavity in the housing.
Figure 5:
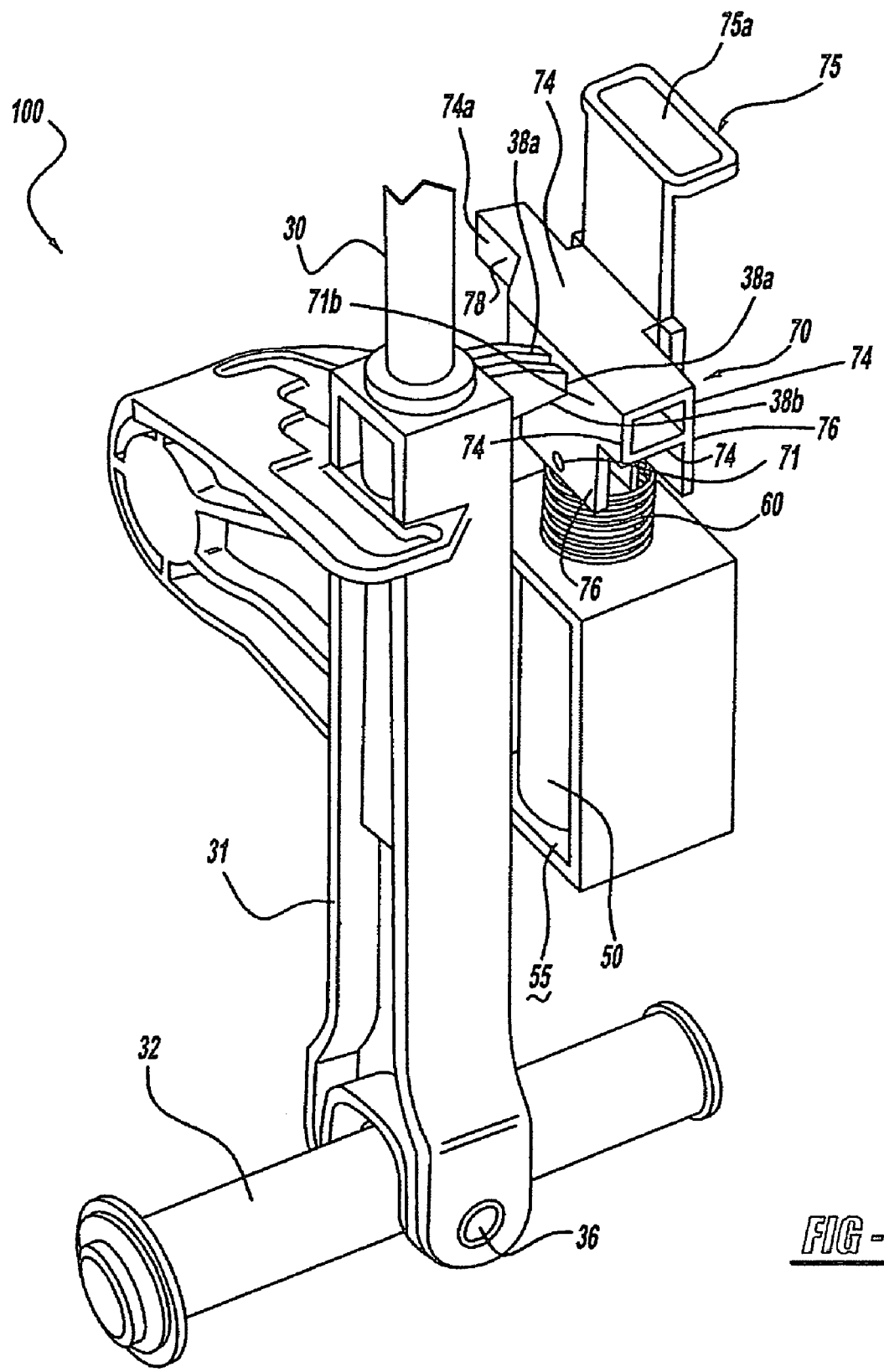
FIG. 5 is a perspective view of the shift lever and projection adjacent the stop in the one condition with the housing removed for the sake of clarity.
Figure 6:
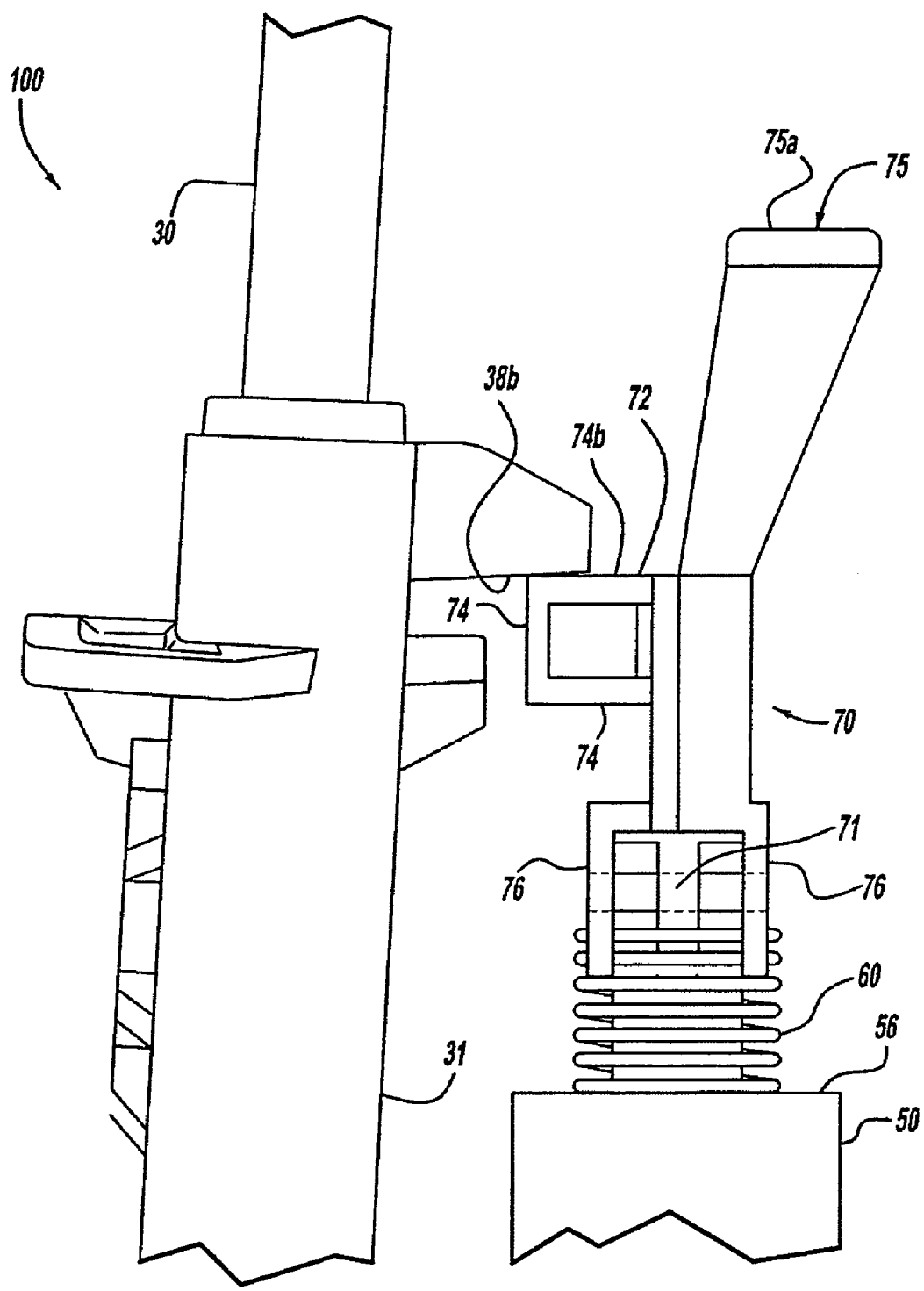
FIG. 6 is a perspective view of the shift lever and projection spaced away from the stop in the shift range of "N" with the housing removed for clarity.
Figure 7:
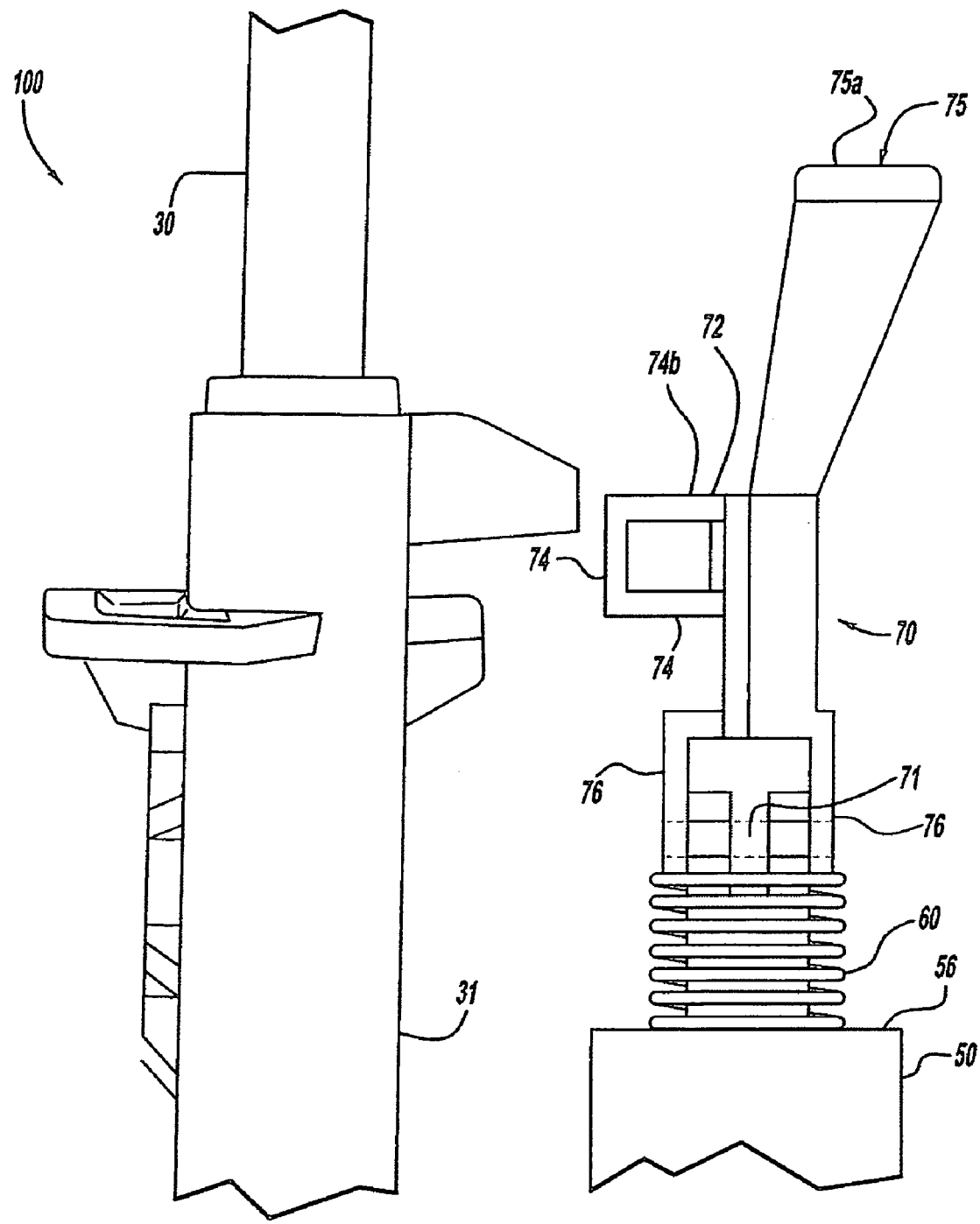
FIG. 7 is a side view of the shift lever and projection spaced away from the stop in the shift range of "3 D" with the housing removed for clarity.
Figure 9:
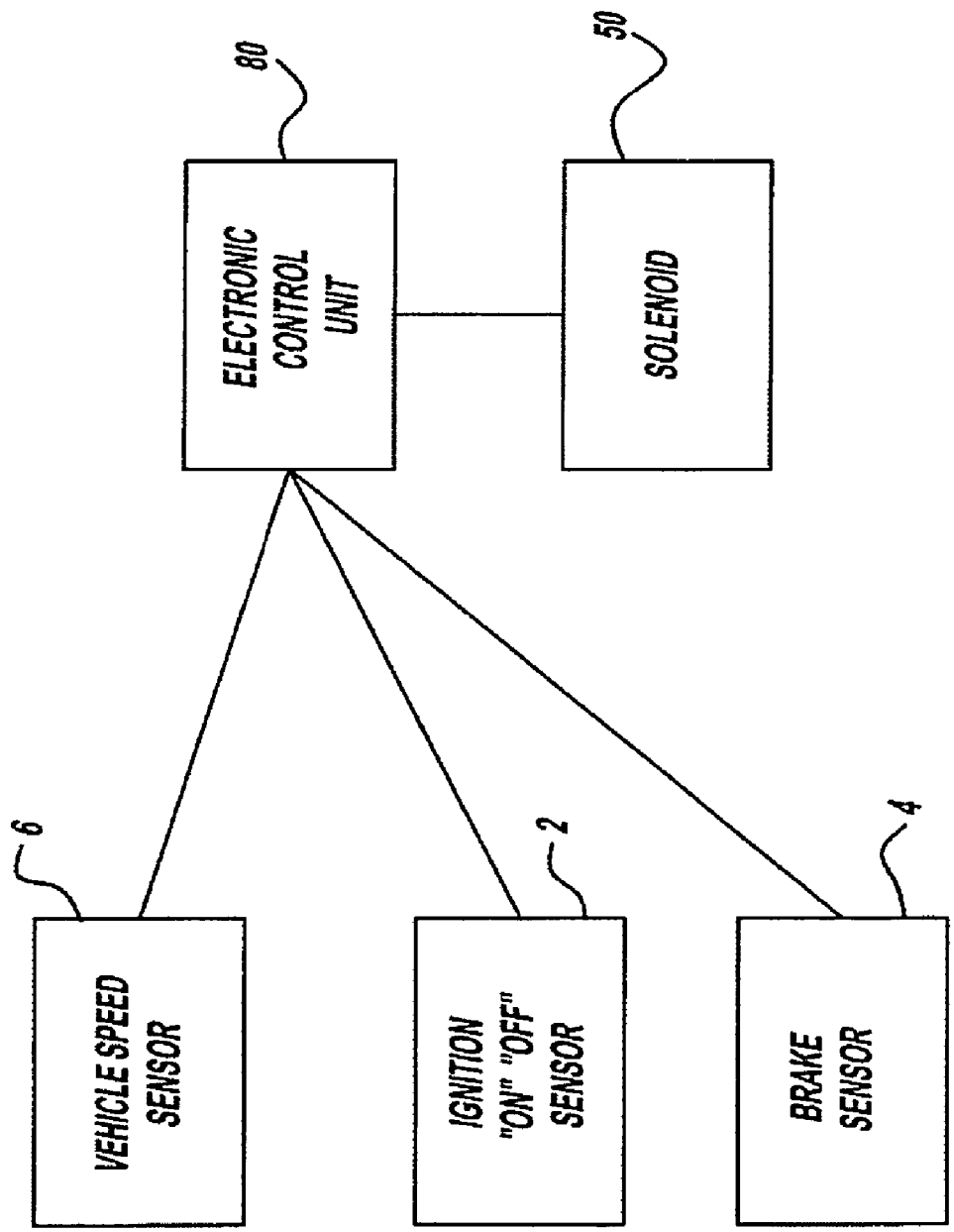
FIG. 9 is a schematic representation of the electronic control unit connected to the speed sensor, ignition sensor, brake sensor and the solenoid switch.

In operation, with the shift lever is positioned in "P" shift range position (as shown in FIG. 4) and the ignition key in the "on" position in the ignition switch or alternatively when the engine (not shown) in the motor vehicle is operational, a suitable ignition sensor 2 sends a signal to the electronic controller unit 80. Additionally, when the vehicle operator's foot presses on or against the brake pedal, a signal is sent from a conventional brake sensor 4 to electronic controller 80 as shown in FIG. 9. Once the electronic controller determines that the vehicle is not moving, such as by means of a signal from a conventional vehicle speed sensor 6, and with an appropriate signal from the ignition sensor 2 and the brake sensor 4, the controller energizes solenoid 50. The energized solenoid pulls the guide block 70 in the track in housing 20 toward the solenoid and the nose portion 38a of projection 38 on the shift lever no longer abuts or is adjacent to guide 78. The motor vehicle operator is then permitted to move shift lever 30 in guide hole 40 out of the "P" shift range to the other shift range positions. Once the vehicle becomes operational and controller 80 senses movement of the vehicle such as by way of non-limiting example, a thresh-hold speed that is above 5 kilometer per hour vehicle speed, the power to the solenoid is terminated and guide block 70 is urged away from the solenoid by biasing member 60. However, since the operator has moved the shift lever to one of the "R", "N", "3-D", "2", or "1" shift range positions to permit movement of the vehicle, nose portion 38a is positioned out of the "P" range position (as shown in FIGS. 5 and 6). Under these conditions, nose portion 38a is spaced away from block 70 and the vehicle is moving above the thresh-hold speed, the operator is prevented from moving shift lever 30 longitudinally from "N" to "R" because the shift lever must move transversely into the guide path corresponding to "N" portion. In order to move the shift lever from "3-D" or "N" to "R" shift range position. Certain conditions must be met, for example by way of non-limiting example, the vehicle speed must be below 5 kilometer per hour vehicle speed. Once this condition is met, the solenoid is energized to pull the block 70 down to allow the lever move into "R" or "P" shift range position from "N" shift range position. This is called a "reverse gear lock-out" device. In this condition, the nose portion abuts against guide 78 to prevent further transverse movement of shift lever 30 in guide path 40. However, the operator is still able to move shift lever 30 to the "3-D", "2" or "1" position. The operator is able to move the shift lever into the "R" position only after the shift lever is moved out of or from the "N" shift range position.

In the event of a low battery condition, and with the vehicle in a parked condition, stop 10 is provided with a manual-override device 75. The manual-override device 75 extends axially away from body 70 and solenoid 50. The operator presses on the override device 75 to overcome the bias of biasing member 60 thereby disengaging guide 78 from nose portion 38a. This permits transverse and longitudinal movement of shift lever 30 in guide hole 40 since the stop no longer restricts movement of the shift lever out of the "P" range position. In all other aspects, stop 10 operates as described previously. Override device or projection 75 can take on many forms such as shown in FIGS. 3–7 or alternately as shown in FIG. 8.

In FIGS. 3–7, the override 75 has a pushdown portion 75a that is manually actuated and extends longitudinally from body or block 70. The operator presses portion 75a toward the solenoid and forces body 70 toward the solenoid and to overcome the bias in biasing member 60. This permits movement of the shift lever out of the first condition, that is, the "P" range position to the other or second condition.

Figure 8:
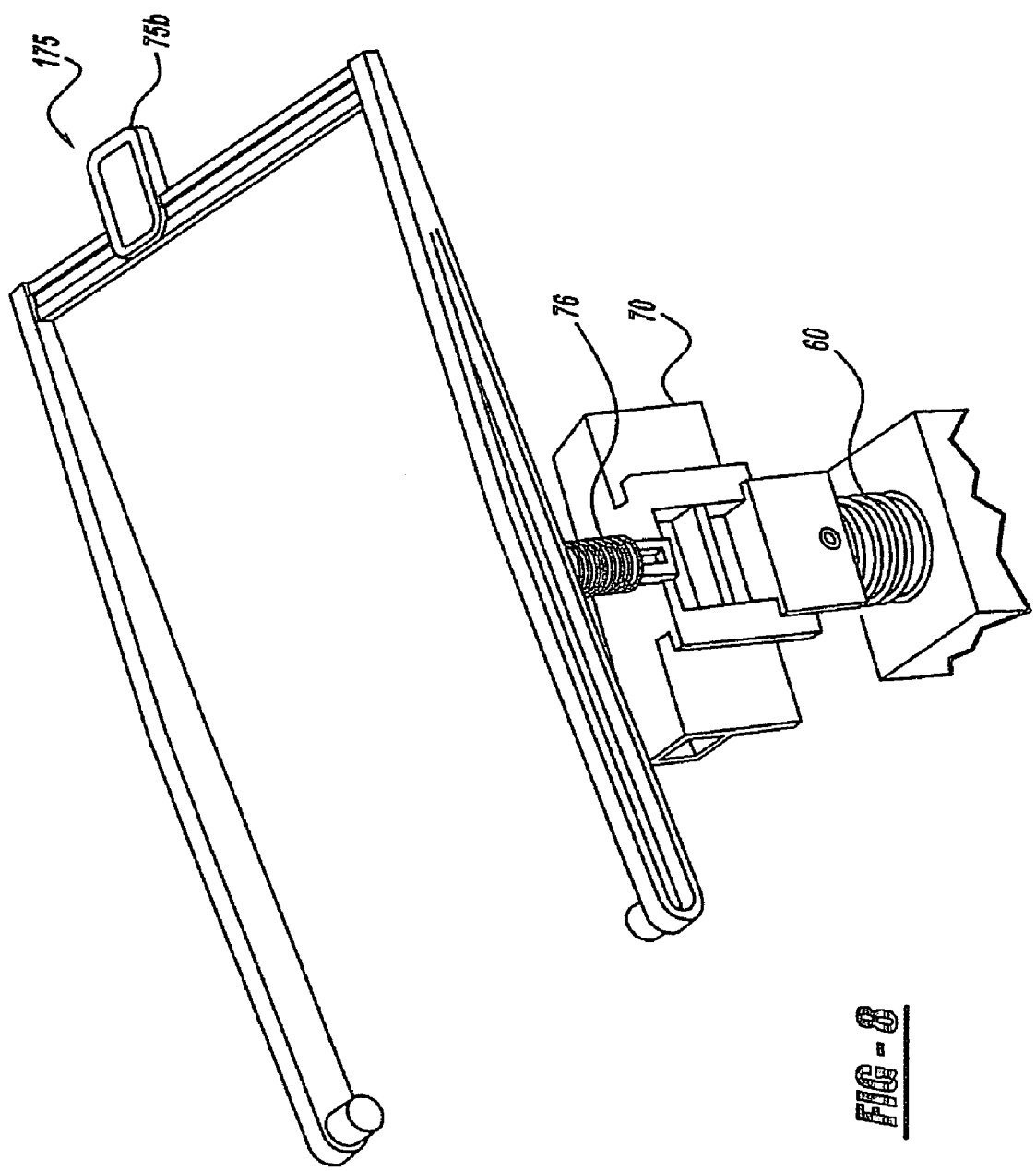
FIG. 8 is a partial view of a manual override with a U-shaped bracket and pivot attachment points at each end.

In FIG. 8, the override 175 has a U-shaped bracket with a pushdown section 75b. The U-shaped bracket is mounted at each end of the bracket to housing 20 and has a second biasing member 76 to urge the section 75b away from block 70. The U-shaped bracket is disposed about the periphery of housing 20 and is pivotally mounted in aligned holes (not shown) in the housing in a well-known manner. Pressing down on section 75b, causes the bracket to overcome the bias of bias member 60 and move the stop toward the solenoid. This permits movement of shift lever 30 out of the "P" range position of the first condition to the other shift lever positions of the other or second condition. A second biasing member is provided to urge the U-shaped bracket back to its original position after use by the operator, that is, away from guide block 70.

In view of the foregoing disclosures, those skilled in this area of the art will recognize that various modifications can be made to the embodiments described herein, without departing from the true scope and spirit of the present invention. All such alternative embodiments are intended to be covered by the following claims:

What I claim is:

1. A shift lever device adapted for use in a vehicle with an activation mechanism generating a vehicle activation signal, a transmission having a plurality of shift ranges including a P shift range, a R shift range, an N shift range, a 3 D shift range and a vehicle speed sensor generating a vehicle speed signal, said shift lever device comprising, in combination:
   a brake activation device;
   a shift lever connected to the transmission, the shift lever being operated in a longitudinal and transverse direction of the vehicle so as to be selectively moved to any one of the plurality of shift ranges to shift-operate the transmission;

a brake sensor connected to the brake activation device, the brake sensor generating a brake-indicating signal in response to sensing operation of the brake activation device;

a stop device adjacent to the shift lever, the stop device in one condition preventing the movement of the shifter lever from the P shift range and in a second condition permitting movement of the shift lever from the P shift range to one of the N shift range, the R shift range and the 3 D shift range;

a solenoid device connected to the stop device, the solenoid device moving the stop device so as to permit movement of the shift device between the one condition and the second condition;

a biasing member urging the stop device toward the one condition;

an electric controller device connected to the solenoid device, the brake activation device, the activation mechanism and the vehicle speed sensor, the controller device in response to the brake-indicating signal, the activation signal and the vehicle speed signal sends a signal to operate the solenoid device so as to move the stop device from the one condition to the second condition in order to release the shift lever from the P shift range and to permit the shift lever to be selectively moved to one of the R shift range, the N shift range and the 3D shift range; and a guide block attached to the solenoid device, the biasing member being disposed between the solenoid device and the guide block, the biasing member urging the guide block away from the solenoid device.

2. A shift lever device adapted for use in a vehicle with an activation mechanism generating a vehicle activation signal, a transmission having a plurality of shift ranges including a P shift range, a R shift range, an N shift range, a 3 D shift range and a vehicle speed sensor generating a vehicle speed signal, said shift lever device comprising, in combination:

a brake activation device;

a shift lever connected to the transmission, the shift lever being operated in a longitudinal and transverse direction of the vehicle so as to be selectively moved to any one of the plurality of shift ranges to shift-operate the transmission;

a brake sensor connected to the brake activation device, the brake sensor generating a brake-indicating signal in response to sensing the operation of the brake activation device;

a stop device adjacent to the shift lever, the stop device in one condition preventing the movement of the shifter lever from the P shift range and in a second condition permitting movement of the shift lever from the P shift range to one of the N shift range, the R shift range and the 3 D shift range;

a solenoid device connected to the stop device, the solenoid device moving the stop device so as to permit movement of the shift device between the one condition and the second condition;

a biasing member urging the stop device toward the one condition;

an electric controller device connected to the solenoid device, the brake activation device, the activation mechanism and the vehicle speed sensor, the controller device in response to the brake-indicating signal, the activation signal and the vehicle speed signal sends a signal to operate the solenoid device so as to move the stop device from the one condition to the second condition in order to release the shift lever from the P shift range and to permit the shift lever to be selectively moved to one of the R shift range, the N shift range and the 3 D shift range; and a guide block adjacent the solenoid device, the guide block having a body, the body having at least one side wall, the shift lever having a projection member, the one side wall guiding the projection member from one condition to a second condition.

3. A shift lever device adapted for use in a vehicle with an activation mechanism generating a vehicle activation signal, a transmission having a plurality of shift ranges including a P shift range, a R shift range, an N shift range, a 3 D shift range and a vehicle speed sensor generating a vehicle speed signal, said shift lever device comprising, in combination:

a brake activation device;

a shift lever connected to the transmission, the shift lever being operated in a longitudinal and transverse direction of the vehicle so as to be selectively moved to any one of the plurality of shift ranges to shift-operate the transmission;

a brake sensor connected to the brake activation device, the brake sensor generating a brake-indicating signal in response to sensing the operation of the brake activation device;

a stop device adjacent to the shift lever, the stop device in one condition preventing the movement of the shifter lever from the P shift range and in a second condition permitting movement of the shift lever from the P shift range to one of the N shift range, the R shift range and the 3 D shift range;

a solenoid device connected to the stop device, the solenoid device moving the stop device from the one condition to the second condition;

a biasing member urging the stop device toward the one condition; and an electric controller device connected to the solenoid device, the brake sensor, the activation mechanism and the vehicle speed sensor, wherein the controller device in response to the brake-indicating signal, the vehicle activation signal and the vehicle speed signal sends a signal to energize the solenoid device so as to move the stop device from the one condition to the second condition in order to release the shift lever from the P shift range and to permit the shift lever to be selectively moved to one of the R shift range, the N shift range and the 3 D shift range; and a reverse gear lock-out device in the stop device, the reverse gear lock-out device preventing the shift lever from moving to the R shift range position from one of the 3D shift range position and the N shift range position.

* * * * *